United States Patent Office 2,761,863
Patented Sept. 4, 1956

2,761,863

1,3-DI-(LOWER-ALKYL)-7-(3-KETO-2-BUTYL)-XAN-THINES AND PROCESS OF MAKING SAME

Karl Doebel and Hans Spiegelberg, Basel, Switzerland, assignors to Hoffmann-La Roche Inc., Nutley, N. J., a corporation of New Jersey No Drawing. Application October 15, 1954,
Serial No. 462,629

Claims priority, application Switzerland November 4, 1953

5 Claims. (Cl. 260—256)

The present invention concerns novel xanthine derivatives and a process for the manufacture thereof.

The novel xanthine derivatives provided by the present invention are 1,3-di-(lower alkyl)-7-(3-keto-2-butyl)-xanthines, more particularly 7-(3-keto-2-butyl)-theophylline. Surprisingly, the said novel xanthine derivatives are highly water-soluble and may form aqueous solutions of a concentration up to 20% at 20° C. The high solubility in water of the 1,3-di-(lower alkyl)-7-(3-keto-2-butyl)-xanthines was unexpected, inasmuch as the other isomeric keto-butyl derivatives of dialkyl-xanthines have been found to be only slightly or even very difficultly soluble in water. The novel 1,3-di-(lower alkyl)-7-(3-keto-2-butyl)-xanthines possess a theophylline-like action on the heart and may therefore be used as pharmaceuticals. They can also be employed as intermediates in the production of further compounds with a similar action.

The invention further provides a proces for the manufacture of the above mentioned 1,3-di-(lower alkyl)-7-(3-keto-2-butyl)-xanthines, which process comprises reacting a salt of a 1,3-di-(lower alkyl)-xanthine with 2-chloro-butanone-3 in an organic solvent. The salts of the xanthine compound preferably used for this purpose are the alkali metal salts or heavy metal salts, for example the silver salt. However, a salt of the xanthine compound with a tertiary organic base, especially triethyl amine, may also be employed. In this case, the salt may advantageously be produced immediately before reacting the same with the 2-chloro-butanone-3 by mixing the xanthine compound with an amount of the tertiary organic base even sufficient to the salt formation.

The reaction with the 2-chloro-butanone-3 is suitably effected in an organic solvent, such as alcohol. It is recommended to heat the reaction mixture to a medium temperature, for example to the boiling temperature of the alcohol.

Example 20 parts by weight of sodium theophyllinate are suspended in 150 parts by volume of ethanol, while stirring, whereupon 11 parts by weight of 2-chlorobutanone-3 are added dropwise in the course of 10 minutes. Thereafter, the mixture is refluxed while continuously stirring until the entire amount of chlorine is present in the form of sodium chloride. The sodium chloride is sucked off, the ethanolic filtrate is evaporated in vacuo and the residue is recrystallized from methanol/ether or from very little ethanol. The 7-(3-keto-2-butyl)-theophylline thus obtained crystallizes in needles of melting point 118–120° C. (uncorrected). The corresponding phenylhydrazone has a melting point of 168–170° C.

We claim:

1. 1,3-di-(lower-alkyl)-7-(3-keto-2-butyl)-xanthine.
2. 7-(3-keto-2-butyl)-theophylline.
3. A process which comprises reacting 2-chlorobutanone-3 with a salt of a 1,3-di-(lower alkyl)-xanthine and a member of the group consisting of an alkali metal, a heavy metal and a tertiary organic base in an organic solvent.
4. The process of claim 3, wherein a salt of theophylline and a member of the group consisting of an alkali metal, a heavy metal and a tertiary organic base is used as starting material.
5. A process which comprises reacting 2-chlorobutanone-3 with an alkali metal salt of theophylline by heating in ethanol.

No references cited.